(12) United States Patent
Chamberlain et al.

(10) Patent No.: US 8,054,819 B2
(45) Date of Patent: Nov. 8, 2011

(54) SYSTEM AND METHOD FOR SETTING A DATA RATE IN TDMA COMMUNICATIONS

(75) Inventors: Mark W. Chamberlain, Honeoye Falls, NY (US); David A. Clark, Rochester, NY (US); Joseph Shaver, Rochester, NY (US); John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1005 days.

(21) Appl. No.: 11/951,498

(22) Filed: Dec. 6, 2007

(65) Prior Publication Data
US 2009/0147766 A1    Jun. 11, 2009

(51) Int. Cl.
*H04B 7/212* (2006.01)
(52) U.S. Cl. ......... 370/347; 370/498
(58) Field of Classification Search ............ None
See application file for complete search history.

(56) References Cited

U.S. PATENT DOCUMENTS

| | | | | |
|---|---|---|---|---|
| 5,936,570 A * | 8/1999 | Ghazvinian et al. | 342/354 |
| 6,219,356 B1 * | 4/2001 | Beukema | 370/516 |
| 6,252,854 B1 * | 6/2001 | Hortensius et al. | 370/252 |
| 6,272,633 B1 * | 8/2001 | Duke et al. | 713/171 |
| 6,473,395 B1 * | 10/2002 | Lee | 370/209 |
| 6,714,551 B1 * | 3/2004 | Le-Ngoc | 370/401 |
| 6,760,860 B1 | 7/2004 | Fong et al. | 714/4 |
| 6,873,619 B1 * | 3/2005 | Edwards | 370/392 |
| 6,985,465 B2 * | 1/2006 | Cervello et al. | 370/333 |
| 7,000,021 B1 | 2/2006 | Radhakrishnan et al. | 709/230 |
| 7,007,218 B2 | 2/2006 | Chamberlain | 714/748 |
| 7,085,539 B2 | 8/2006 | Furman | 455/67.13 |
| 7,145,937 B2 * | 12/2006 | Miller | 375/146 |
| 7,149,192 B2 | 12/2006 | Kwak | 370/320 |
| 7,149,193 B2 | 12/2006 | Fong et al. | 370/328 |
| 7,245,947 B2 * | 7/2007 | Salokannel et al. | 455/574 |
| 7,283,069 B2 | 10/2007 | Shaver et al. | 341/63 |
| 7,412,250 B2 * | 8/2008 | Fukuda | 455/502 |
| 7,801,079 B2 * | 9/2010 | Saidi et al. | 370/331 |
| 2003/0072286 A1 | 4/2003 | Kim et al. | 370/335 |
| 2003/0097623 A1 | 5/2003 | Razavilar et al. | 714/704 |
| 2003/0120990 A1 | 6/2003 | Elbwart et al. | 714/748 |
| 2003/0177429 A1 | 9/2003 | Hessel et al. | 714/751 |
| 2005/0094632 A1 | 5/2005 | Hebsgaard et al. | 370/389 |
| 2005/0195822 A1 | 9/2005 | Lim et al. | 370/393 |
| 2005/0243762 A1 | 11/2005 | Terry et al. | 370/328 |
| 2005/0249133 A1 | 11/2005 | Terry et al. | 370/278 |
| 2005/0276345 A1 | 12/2005 | Norris et al. | 375/265 |
| 2007/0104128 A1 * | 5/2007 | Laroia et al. | 370/329 |
| 2007/0237210 A1 | 10/2007 | Voglewede et al. | 375/136 |

* cited by examiner

*Primary Examiner* — Kwang B Yao
*Assistant Examiner* — Alex Skripnikov
(74) *Attorney, Agent, or Firm* — Allen, Dyer, Doppelt, Milbrath & Gilchrist, P.A.

(57) ABSTRACT

A mobile ad-hoc network includes a plurality of N mobile nodes and wireless communication links connecting the mobile nodes, which each include a communications device for transmitting and routing data packets wirelessly to other mobile nodes via the wireless communication links in accordance with a time division multiple access (TDMA) data transmission protocol using a TDMA epoch that is divided into a beacon interval, digital voice interval and digital data interval. The mobile nodes monitor channel conditions using the beacon, digital voice and digital data intervals and provide a network conductivity performance as valid receptions occur within mobile nodes. A data rate is calculated and set for other N−1 mobile nodes using monitored channel conditions for the beacon, digital voice and digital data intervals.

4 Claims, 7 Drawing Sheets

- RSSI IS DEFINED AS THE NECESSARY SYSTEM GAIN REQUIRED TO HAVE INPUT SIGNAL REACH DESIRED AGC SETPOINT (-8 dBm). OUR AGC CODE OUTPUTS A MODIFIED RSSI VALUE THAT CONTAINS ATTENUATION AND GAIN (FIRST TEN VALUES ARE ATTENUATION).
- RSSI = |SIG| - |SETPOINT| + 10 = |SIG| - 8 + 10 = |SIG|+2

SYSTEM AND METHOD FOR SETTING A DATA RATE IN TDMA COMMUNICATIONS

FIELD OF THE INVENTION

The present invention relates to communications, and more particularly, the present invention relates to time division multiple access (TDMA) channel access communications systems and related methods used in wireless ad-hoc communications.

BACKGROUND OF THE INVENTION

Mobile ad-hoc networks (MANET's) are becoming increasingly popular because they operate as self-configuring networks of mobile routers or associated hosts connected by wireless links to form an arbitrary topology. The routers, such as wireless mobile units, can move randomly and organize themselves arbitrarily as nodes in a network, similar to a packet radio network. The individual units require minimum configuration and their quick deployment can make ad-hoc networks suitable for emergency situations. For example, many MANET's are designed for military systems such as the JTRS (Joint Tactical Radio System) and other similar peer-to-peer or Independent Basic Service Set systems (IBSS).

TDMA technology is becoming more popular for use in these mobile ad-hoc network systems. In an ad-hoc network using a TDMA communications protocol, channel access scheduling is a platform of the network structure. Some problems are encountered with distributed channel scheduling used in a multi-hop broadcast networks. As known to those skilled in the art, the optimum channel scheduling problem is equivalent to the graph coloring problem, which is a well known NP-complete problem, cited in numerous sources. Many prior art systems assume that the network topology is known and is not topology transparent.

Physically, a mobile ad-hoc network includes a number of geographically-distributed, potentially mobile nodes sharing a common radio channel. Compared with other types of networks, such as cellular networks or satellite networks, the most distinctive feature of mobile ad-hoc networks is the lack of any fixed infrastructure. The network may be formed of mobile nodes only, and a network is created "on the fly" as the nodes transmit with each other. The network does not depend on a particular node and dynamically adjusts as some nodes join or others leave the network.

The standards governing Wireless Local Area Networks (WLANs) networking products are defined by a suite of specifications issued by the IEEE and known as the IEEE 802.11 standard, incorporated herein by reference in their entirety. The standards define the operation of both the radio PHY layer and the MAC layer including a synchronization mechanism. The synchronization mechanism is used to provide a uniform time base.

For ad-hoc networks, the timing synchronization is typically implemented using a distributed algorithm that is performed by the member nodes. Each node typically transmits beacons in accordance with an algorithm defined in the 802.11 standard. Each node adopts the timing received from any beacon or probe response that has a timing synchronization function value later than its own timer.

One principle of wireless communications environments using TDMA protocols is changes in the propagation can cause an unsophisticated protocol or waveform to cease in delivering data or effect the packet error rate (PER) efficiently. Usually some systems use Automatic Repeat Request (ARQ) algorithms that improve deliver at a cost of latency and additional network load. In some TDMA ad-hoc networks, it is expected that each node in the network could be moving and connections between nodes would vary in availability and quality. An adaptive data rate algorithm would maintain these link changes by optimally selecting data rate and route for successful packet delivery. The performance is typically no better than what the physical channel can handle, and therefore, it is desirable to determine dynamically an access point to produce a much higher performance system.

Rate adaptation has been used in past TDMA ad-hoc systems such as FS-1052 and STANAG-5066, using data traffic and demodulation statistics between two nodes that currently exchange data. It is possible that some of these systems also used long-term storage of previous observation results to help predict initial waveform selection. Many issues prevent a prediction mechanism using long-term historical data from being successful on the first transfer attempt. As data traffic commences, these algorithms adapt to track the channel depending on how fast the channel changes.

SUMMARY OF THE INVENTION

In accordance with a non-limiting example of the present invention, the technical problem noted above is solved and the solution achieved by adapting the physical layer waveform bit rate selection and bandwidth in real-time to track the channel capacity without the use of automatic repeat request (ARQ). The dynamics of the channel requires real-time monitoring to allow tracking of the "optimal" waveform configuration, resulting in higher data transfer rates allowed by the channel.

A communications system includes a plurality of N mobile nodes forming a mobile ad-hoc network. A plurality of wireless communication links connects the mobile nodes together. Each mobile node includes a communications device for transmitting and routing data packets wirelessly to other mobile nodes via the wireless communication links in accordance with a time division multiple access (TDMA) data transmission protocol using a TDMA epoch that is divided into a beacon interval, digital voice interval and digital data interval. The mobile nodes are operative for monitoring channel conditions using the beacon, digital voice and digital data intervals and providing from each mobile node a network conductivity performance as valid beacon interval receptions occur within mobile nodes. A mobile node is operative for calculating a data rate for the other N−1 mobile nodes when a beacon interval is correctly received using monitored channel conditions for the beacon, digital voice and digital data intervals.

A mobile node is operative for determining the signal-to-noise ratio (SNR), received signal strength indication (RSSI) and packet error rate (PER) for N−1 mobile nodes based on valid beacon interval receptions. Each mobile node can maintain a history of the SNR, RSSI and PER over X second intervals for each respective N−1 node. Each X second interval can be about one to about two seconds.

A mobile node can also be operative for supplementing the history of the SNR, RSSI and PER using the receptions of digital data intervals. A database can contain TDMA waveform selections and a mobile node can select a TDMA waveform from the database based on the SNR, RSSI and a SNR variance.

A mobile node can transmit data at a lower data rate based on a selected TDMA waveform when a transmit slot duration allows a lower rate TDMA waveform to transmit data more robustly.

In a non-limiting example of the present invention, the beacon interval can be formed as a preamble and convolutional coded Gaussian minimum shift keyed (GMSK) data portion. The digital data voice interval can be formed as a preamble and convolutional coded Gaussian minimum shift keyed (GMSK) data portion that is mixed excitation linear prediction (MELP) encoded. The digital data interval can be formed as a preamble and one of a convolutional coded Gaussian Minimum Shift Keyed (GMSK) data portion, turbo coded binary phase shift keyed (BPSK) data portion, quadrature phase shift keyed (QPSK) data portion, and 16-ary quadrature amplitude modulation (QAM) data portion over a plurality of bandwidths using known and unknown equalized blocks.

A mobile ad-hoc network and method is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
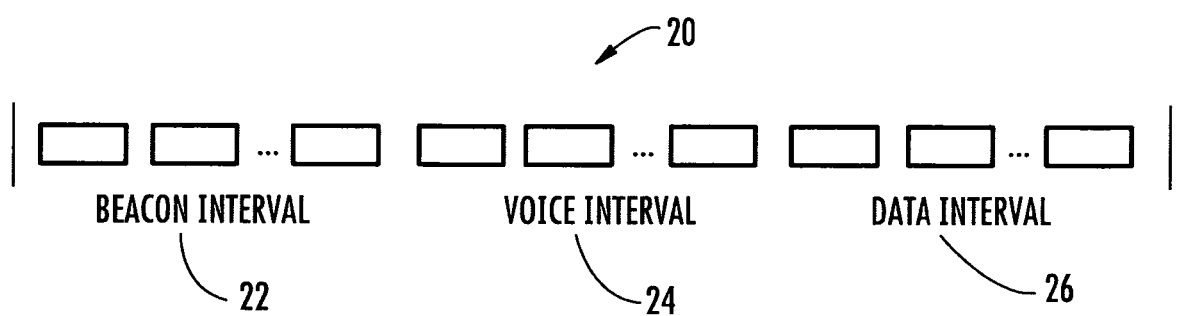
FIG. 1 is a diagrammatic block diagram showing a TDMA waveform having three different waveform sections as a beacon interval, digital voice interval and digital data interval that can be used in accordance with a non-limiting example of the present invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

FIG. 1 is a block diagram showing a TDMA time slot at 20, having three different waveform sections and showing a respective beacon interval 23, a digital voice interval 24 and digital data interval 26. In a non-limiting example, the waveform can be formed as burst waveforms that exist over a duration of about one epoch, with one epoch corresponding to about 0.135 seconds in a slotted TDMA configuration. The beacon can be formed as a 128 symbol preamble and a three-fourths (¾) rate convolutional coded GMSK data portion using 8-ary Walsh modulation over a 16 symbol frame. The digital voice interval can be formed as a 128 symbol preamble and three-fourth (¾) rate convolutional coded GMSK data portion using 8-ary Walsh modulation of a 32 symbol frame that is Mixed Excitation Linear Predictive (MELP) encoded. The digital data interval is usually formed as a 128 symbol preamble and either a convolutional coded GMSK data portion, a turbo coded BPSK data portion, QPSK data portion, or 16-ary QAM data portion over several different bandwidths using a known-unknown-known block structure that is equalized.

In one aspect, the beacon interval, digital voice interval and digital data interval bursts are used to monitor channel conditions. During beacon receptions, which are typically continuous, network connectivity performance is provided from each node in the data payload as valid receptions occur. During the transmitting beacon time slot, the radio can deliver its waveform recommendations for the N−1 other nodes using the previous beacon interval, digital data interval and digital voice interval observations. The system using a mobile node determines the signal-to-noise (SNR), received signal strength indication (RSSI) and packet error rate (PER) and maintains history over a X second interval, typically about 1 to about 2 seconds, from respective N−1 nodes. The SNR, SNR variance, and RSSI short-term history are used to select the best TDMA waveform settings from a set of multi-dimensional tables. Data receptions can be used to augment the SNR, RSSI and packet error statistics. During data transfers, the packet error rate dominates the selection to ensure that the packet error rate is less than about 10%. The sending data node can use the waveform setting recommendation, or it can use a lower rate when the transmit slot duration allows the use of a lower rate waveform to send a required data packet size more robustly.

The network nodes maintain the short-term history of the suggested waveform rates and bandwidths between all nodes even when no data packets flow. The beacons are present and allow the channel conditions to be updated. The history between the nodes is "real-time relevant" and provides the best data rate and bandwidth suggestion for a future data transfer between any network nodes. Even when channel estimates do not track the channel, the highest capacity that provides less than a 10% packet error rate can be adapted. No significant memory resources are required and little processing overhead is required.

The system can be applicable to high-speed packet based network solutions that allow the use of physical channel monitoring. A low complexity algorithm can be used to provide the best over-the-air network capacity for a given channel condition when some packet error is tolerable.

Figure 2:
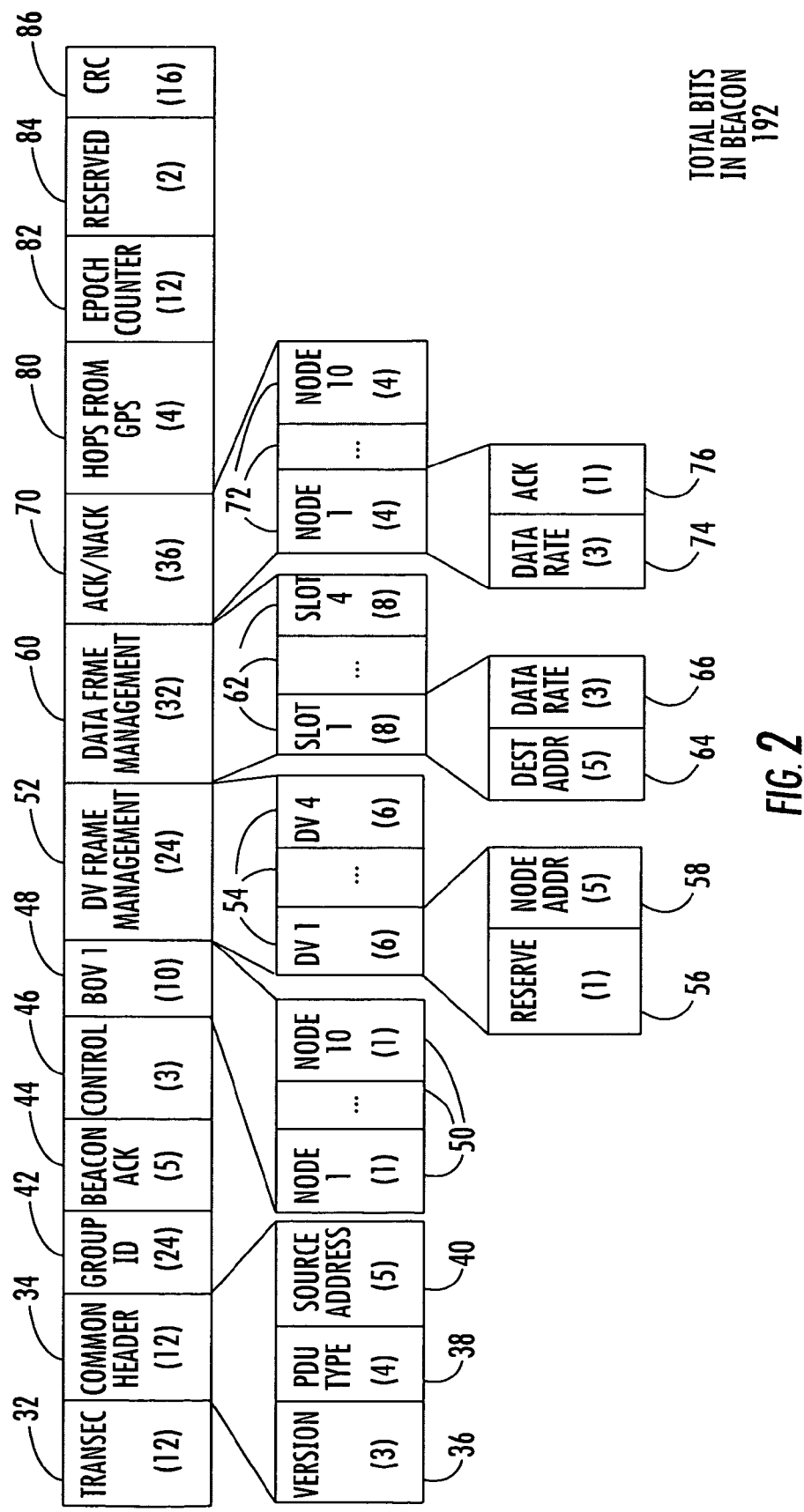
FIG. 2 is an expanded block diagram showing the layout of a beacon interval that includes adaptive bit rate and ARQ bits in accordance with a non-limiting example of the present invention.

FIG. 2 is a block diagram showing a beacon layout that can be used in accordance with a non-limiting example of the present invention. The beacon includes an adaptive bit rate and ARQ bits with total bits in the beacon of about 192 bits in this non-limiting example. For example, the transmission security (transec) field is shown in a first block 32 followed by a common header field 34 that can include version 36, protocol data unit (PDU) type 38 and the source address 40. A group ID 42 and a beacon acknowledgment (ACK) 44 and control 46 field follow. A BOV 48 has data for various nodes 50 as numbered. A digital voice internal frame management field 52 has digital voice sections 54 with the reserve 56 and node address 58 for each of the digital voice frames. A digital data frame management field 60 has several slots 62 with destination address 64 and data rate 66 sections. The ACK/NACK field 70 includes bit sections for respective nodes 72 with data rate 74 and ACK 76 sections. Hops from GPS 80, epoch counter 82, a reserved bit field 84 and a CRC bit field 86 are included. The number of bits per field are set forth in the diagram.

Figure 3A:
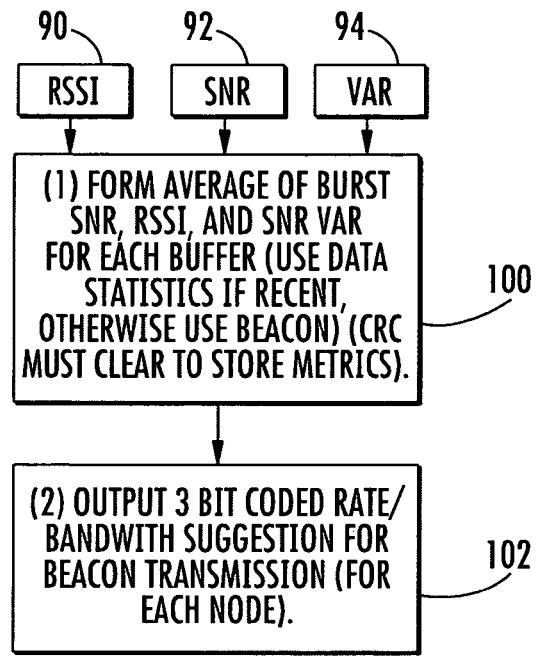
FIGS. 3A and 3B are high-level flowcharts showing an example of a method that could be used for determining data rate during a beacon interval reception in accordance with a non-limiting example of the present invention.
Figure 3B:
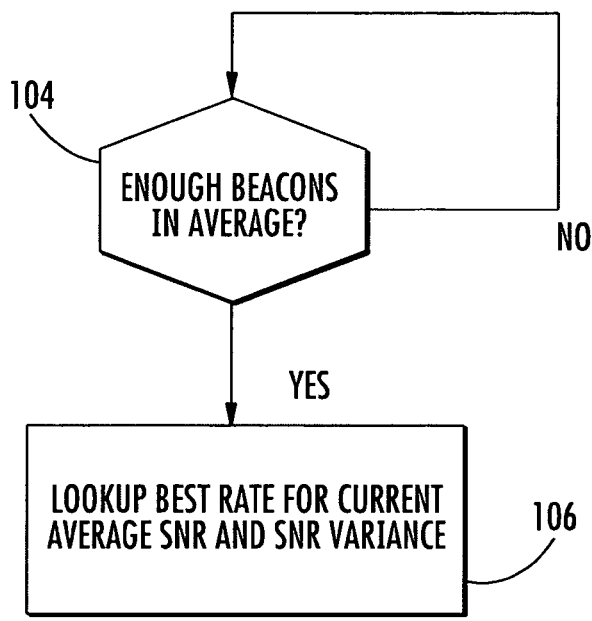

FIG. 3A is a high-level flowchart showing an example of a method for determining data rate during a beacon reception in which the various input variables include the RSSI 90, SNR 92 and SNR variance 94. As illustrated at block 100, the average of the burst SNR, RSSI and SNR variance are formed for each buffer. Data statistics can be used if recent, but otherwise the beacon is used. A two-dimensional table look-up is performed for the best match of the suggested data rate and bandwidth. A three-bit coded rate/BW (bandwidth) suggestion for the beacon transmission for each node is output (block 102). As shown in FIG. 3B, a requirement exists that a minimum number of Beacons are average (block 104) in the table look up of the best rate and bandwidth (block 106). The Beacon based recommendation is used if no data bursts are received in the last 3 seconds. Beacon metrics are only included in the average if the CRC is valid.

Figure 4:
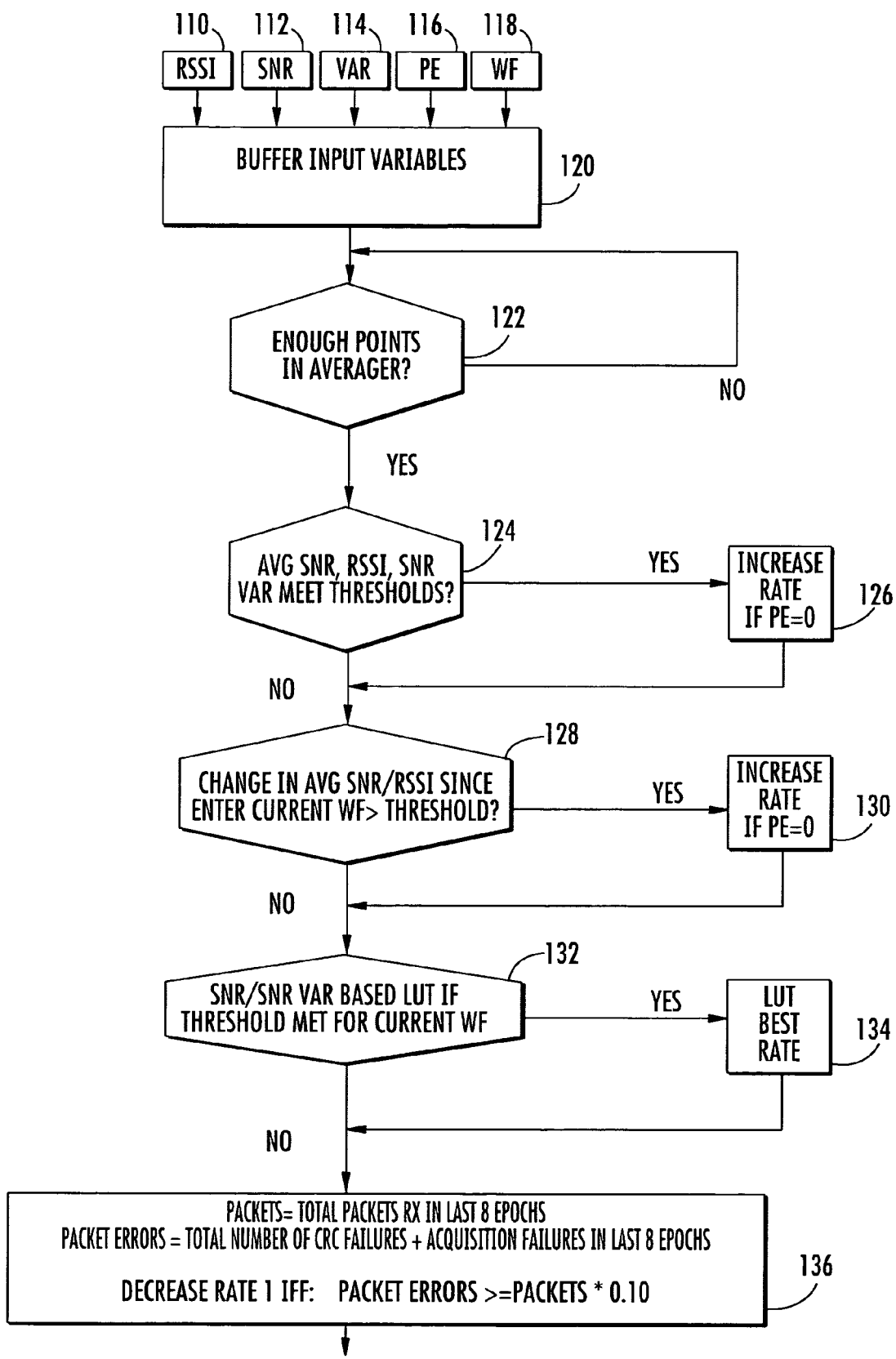
FIG. 4 is a high-level flowchart showing an example of a method that could be used for determining data rate during data reception in accordance with a non-limiting example of the present invention.

FIG. 4 is a high-level flowchart showing a method for determining data rate change rules during data receptions. Inputs include RSSI 110, SNR 112, SNR VAR 114, and Packet Error Rate (PE) 116. A waveform setting (WF) 118 is also saved. The rate adaptation algorithm requires a suitable number of data packets 122. If the average SNR, RSSI, SNR Var meet specific thresholds 124, the rate is increased if the packet error is zero 126. If a change in average SNR or RSSI since the entered waveform exceeds a threshold 128, a rate increase is allowed if the packet error is zero 130. A SNR and SNR VAR based look up table rate selection is performed if the threshold is met for the current waveform 132 to force the best match rate change 134. If the packet error rate exceeds a threshold (10%), the rate and bandwidth is decreased as necessary 136.

Figure 5:
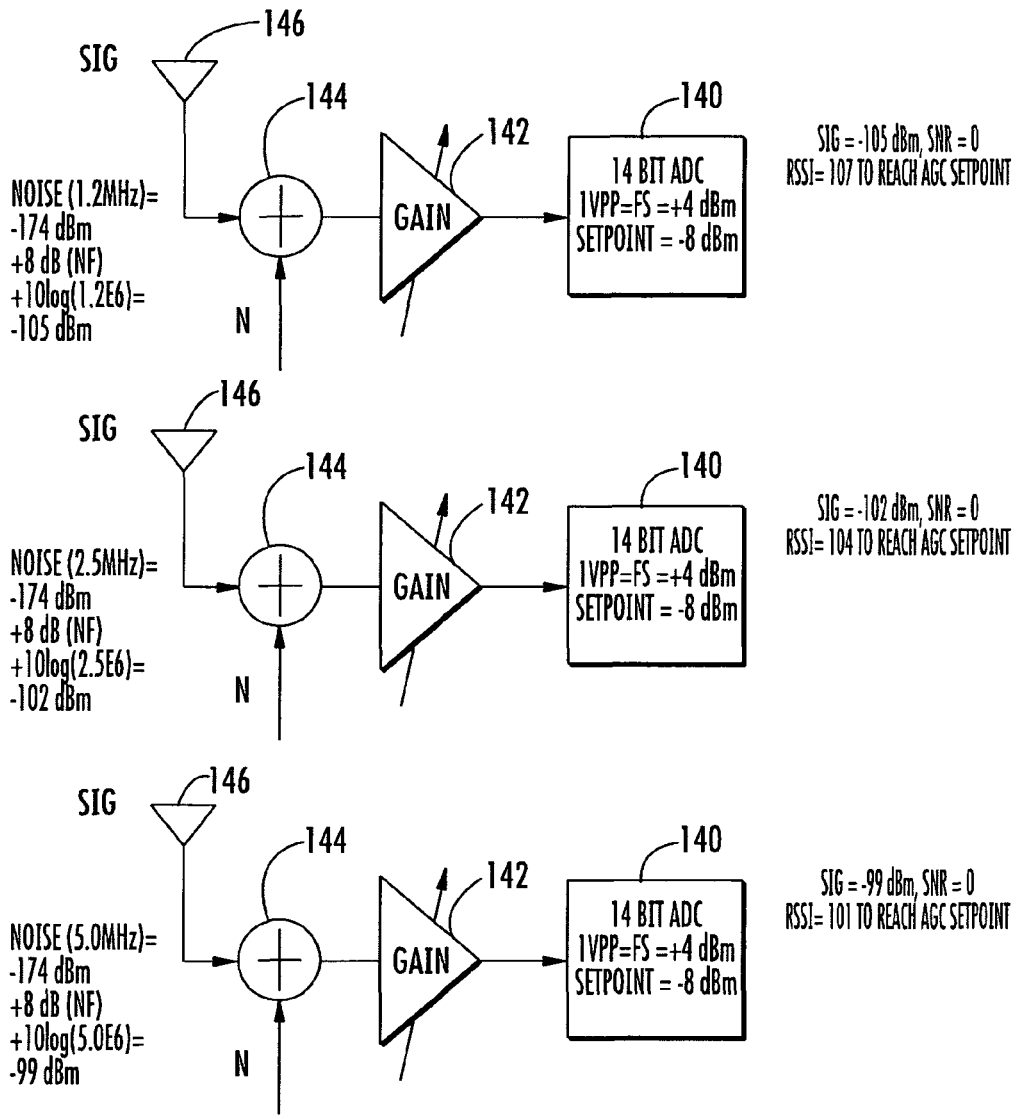
FIG. 5 is a block diagram showing components for the RSSI and estimated SNR in accordance with a non-limiting example of the present invention.

FIG. 5 is a block diagram showing a circuit explanation of the RSSI estimated SNR in which the RSSI is defined as the necessary system gain required to have the input signal reach the desired automatic gain control (AGC) set point of about −8 decibels. The AGC code can output a modified RSSI value that contains attenuation and gain but for the first ten values of attenuation. A series of circuits are shown and in each, as illustrated, an analog-to-digital converter (ADC) 140 receives an input from an adjustable gain amplifier 142 and a mixer 144 operative with the receive antenna 146.

The tables as described before could include data entries for different waveforms at different bandwidths, for example, 1.2 MHz or 5 MHz as non-limiting examples. The table could include data for the number of voice frames and data, such as a one node relay and voice number. The maximum node-to-node throughput and system capacity in kbps could be implemented using the table. Different assumptions could apply to different throughput values such as the duration of the epoch, duration of a MELP frame, system capacity, manner of code combining, and the measurement over interval time periods.

An example of possible data rates and waveforms (WF) is shown in the table below.

| Waveform | Description | Data Rate | Coding | Bandwidth |
| --- | --- | --- | --- | --- |
| GMSK-32 | WF 0 | 56K | ½ Viterbi | 1.2 MHz |
| GMSK-16 | WF 1 | 169K | ¾ Viterbi | 1.2 MHz |
| GMSK-8 | WF 2 | 338K | ¾ Viterbi | 1.2 MHz |

-continued

| Waveform | Description | Data Rate | Coding | Bandwidth |
|---|---|---|---|---|
| PSK-2 | WF 3 | 594K | ¾ Turbo | 1.2 MHz |
| PSK-4 | WF 4 | 1,190K | ¾ Turbo | 1.2 MHz |
| PSK-4 | WF 5b | 2,370K | ¾ Turbo | 2.5 MHZ |
| PSK-4 | WF 6b | 4,470K | ¾ Turbo | 5.0 MHz |

The adaptive data rate capability as described is responsive to an on-the-move mobile network that is experiencing changing topology, and individual link qualities. The system monitors a set of characteristics, by which a node can make data rate recommendations, and use those recommendations to transfer data more reliably. The data rate recommendation exchanges can occur using a normal operating network beacon. Since all nodes monitor this traffic, they are capable of predicting channel quality without having to exchange any data traffic. This is an advantageous aspect when considering networks that are not loaded with data traffic will have the capability to begin transferring IP data at a more optimal data rate, thus improving throughput.

The approach for adapting data rate will leverage different characteristics. For example, the SNR of the GMSK waveform is estimated using the mean and variance of the soft decisions over eight frames in one non-limiting example. For a DDE based waveform, a KU block SNR is measured from the demodulated complex estimate distance to the decoded reference symbols. Both the GMSK and DDE SNR block estimates are then refined using a table correction. Finally, the SNR estimates are averaged over the entire burst. The SNR Mean value is stored on a per node basis such that a one (1) second history is maintained.

The degree of fading can be estimated by measuring the variance of the SNR over multiple bursts. Other methods are available to estimate the fade rate accurately as known to those skilled in the art, but could impact the modem's VHDL design complexity and the loading limitations available on some systems such as a waveform digital signal processor (WDSP). The fading characteristics can be determined by looking at the variance of the modem's block SNR for each reception. The fading characteristic has significant impact on data performance (i.e., packet errors), and is characterized and used in concert with the channel SNR.

The RSSI is a measurement of receive signal strength in dBm. The RSSI strength provides an additional indicator on the maximum data rate a link can support by providing another means to estimate the receive SNR. This is helpful in mobile environments when a signal shows link margin and consistent gain or decrease in signal strength as distance from antennae changes. In a fading environment, the RSSI is a better estimate of the SNR than can be estimated from the waveform alone. History of RSSI can be kept for each node over a one second interval to allow an average RSSI value to be computed.

The packet error rate (PER) is a measurement of the number of packets that do not clear cyclic redundancy check (CRC). HP-MAC assembles one or more protocol data units (PDU's) in a data frame, with each PDU having a CRC. The PER impacts the change of data rate and is dependent on the size of each PDU and the channel bit error rate. The estimated packet error rate provides validation to the rate selection process. For example, RSSI or SNR could indicate a higher data rate, when the PER is greater than a desired threshold, causing the algorithm (system) to go down in data rate. This is due in part to the difficulty in characterizing all possible channel conditions and the limited signal duration to estimate channel conditions accurately. The history of the PER can be stored for each node to which a data frame is received over the air.

It is possible to optimize the transmission of data packets to the lowest data rate that will fit the packet(s) into a node's data frame. This determination is made for low offered loads at the transmitting node when enhanced robustness can be obtained without effecting throughput.

The beacon PDU used for normal operation of the network can be modified to contain rate adaptation control bits (Data Rate/bandwidth suggestion & ACK/NACK status bits) as shown in FIG. 2. This ACK/NACK field 70 can contain 36 bits in which up to 9 neighbors are informed of a node's recommended data rate selection. Each section can contain three bits for data rate/bandwidths 74, and one bit for data frame ACK status 76. To accommodate this increase in the beacon, the Data Frame Management field 60 was reduced in size from 40 to 32 bits. Overall the beacon size did not change. No other management messages are needed outside of the beacon PDU to exchange rate recommendations with neighboring nodes.

Each node in the network tracks the signal characteristics when the network is in operational state, meaning each node has a dedicated beacon slot assignment. Every node attempts to receive each beacon, so metrics will always be available each epoch. A node will calculate a recommended data rate when a beacon reception is correctly received. A one-second or more history of these beacon statistics is kept to help determine more accurately the channel fading characteristic as a non-limiting example. Nodes which fail to receive a beacon will not record any of the actual statistics. The history can be cleared one index at a time for each beacon that is missed. After 1 second of not receiving a node's beacon, that node will have no history, and be given a recommendation of the lowest data rate. In one example, the beacon data rate can be fixed (WF 1 or GMSK-16 chip—169 kbps), and not changed by the adaptive data rate scheme.

When a node forms its beacon for transmission, the node fills in a recommended data rate and ACK Status bit for nine network members (as a non-limiting example) using a beacon ACK/NAK field. The status will be inserted in a slot order with the first beacon slot in index 0 and so on. The transmitting node forming this status places the next slot location in an index location until all 9 locations are filled. The recommended data rate information includes beacon statistics from the current epoch unless recent data statistics are available. A receiving node processes each beacon containing this rate suggestion, storing it based on a node address for later usage for the next data transmit. Depending on the beacon slot order, this recommendation could be used in the current epoch or the next epoch. The data frame ACK bit is also set indicating if the last reception was received error free, otherwise it is cleared. It is possible for this bit to be used in ARQ scheme in the future when reliable data delivery is implemented.

A node that has traffic to send can use the last rate recommended by the receiving node, although an exception could be made when sending internal OLSR traffic, which is sent at a fixed rate to ensure its robustly delivered. If there is insufficient data packets queued to fill an entire frame at the recommended rate, the data rate can be lowered to allow the most robust transfer that will fit the data packets into the data frame. This determination can be made when forming the node's beacon for transmission. If the destination node's beacon is not received, the recommended data rate used by the transmitting node can be decreased to that node to account for a deteriorating link between the two nodes. This decrease can occur after about five consecutive beacon misses.

A node receiving data traffic can monitor the reception characteristics described above to form a data rate recommendation to the sending node in the next beacon. Statistics gathered as a result of a data frame reception can supersede that of a beacon, since the data reception has substantially more gathered statistics including the packet error rate. The system can use two methods for determining data rate. One can be used for beacons and the other for data frames. FIGS. 3 and 4 show the high-level diagrams.

It is possible to improve the next hop route selection in a situation where a node needs to relay traffic through another node to reach the intended destination. An Optimal Link State Routing (OLSR) protocol can be used to pick the shortest route. When there are multiple routes to choose from, OLSR picks the lowest address. This default selection does not factor into account route quality. With the addition of the adaptive data rate, a node has a potential mechanism to determine route choice using data rate recommendations from each of the next hop nodes. In an adaptive data rate approach, the system could propagate channel metrics (either a data rate (0-6) or a RSSI using the OLSR messages that are transmitted across the network).

A straightforward mechanism adds to OLSR such that a one (1) relay route can be chosen based on best quality. The adaptive data rate feature is operable and monitoring the network's beacon and data traffic. This can then be given to OLSR for route selection. In addition these quality metrics can be communicated in the OLSR HELLO messages through a slight increase in size of eight bits per link message. A link message is sent for each node that is one hop away.

Initially the node-to-node quality for the one hop neighborhood can be known from the adaptive data rate statistics. After HELLO messages are exchanged, and each node determines its two hop neighbors, the quality information will be complete to allow a more optimal route to be determined. HELLO messages can be sent every two seconds including that the precise channel estimates will be delayed in regards to how OLSR will choose the route.

OLSR on each epoch can update local one hop quality measurements by HP-MAC. Route choices would be recalculated, and all future traffic route selection will be impacted.

OLSR tracks two hop metrics and can be enhanced to track two quality metrics per node in its routing table. Each of these quality metrics represents a directional path from two nodes, allowing each node to have quality metrics from all of its two hop neighbors. These metrics are communicated using the link message portion of the HELLO message that is sent every two seconds. It is envisioned that four bits are necessary for each direction, for a total increase of eight bits. This addition would extend the node information field from 24 bits (address) to 32 bits. One bit would be reserved for potential future capability to constrain route choice, either through a static decision or due to traffic saturation or low battery life. As a future enhancement topology messages could also have the same information such that the entire network link quality could be factored into route choice.

Commonly assigned U.S. Pat. No. 7,085,539, the disclosure which is hereby incorporated by reference in its entirety, is an example of a system and method that can characterize a communications channel with respect to signal-to-noise ratio (SNR), time dispersion or multi-path, and frequency dispersion or Doppler spread. Such system could be adapted and modified for use in the system as described. A probe signal modulator can receive a probe signal transmitted on a wireless communication channel and generate a demodulated probe signal. A probe signal remodulator can generate a replica probe signal. A delay unit can generate a delayed probe signal and an adaptive canceller can receive the delayed probe signal and generate a residual noise signal and channel characterization signal. A channel characterization block can receive the channel characterization signal and the residual noise signal to generate channel measurements of the wireless communication channel.

There now follows details of an algorithm description in accordance with a non-limiting example of the present invention.

Adaptive Data Rate (ADR) Algorithm Details
Calculation of Burst SNR

Calculation of Beacon SNR
NoisePower = mean(sd[ ]*sd[ ]) − mean(abs(sd[ ]))$^2$
SigPower = mean(abs(sd[ ]))$^2$
SNR = 10*log10(SigPower/NoisePower)
Data Rate Based Correction Factor is then applied:
If DataRate == 1 (32 Chip GMSK)
    SNR = SNR − 18
Else if DataRate == 2 (16 Chip)
    SNR = SNR − 15
Else if DataRate == 3 (8 Chip)
    SNR = SNR − 10
Calculation of Rake WF SNR
Same as Beacon Calculation
Calculation of Equalized WF SNR
NoisePower = sum(d [i] $^2$) where d[i] is squared Euclidean distance to closest constellation point
SigPower = sum(P[i]) where P[i] is power (squared euclidean distance from origin) of closest constellation point
SNR = 10*log10(SigPower/NoisePower)

Metric Accumulation
Data
Packets and Packet Errors

For each an array of packet count and packet error count history is maintained. The current packet/packet error history length is 8 pdus, not including beacons.

Each time a packet is found in a received PDU the packet count for the current rx pdu is incremented.

Each time a packet is found and the CRC fails the packet error count for the current rx pdu is incremented.

Packets and errors are only counted when the received pdu matches the last recommended data rate and bandwidth.

When a missed acquisition is detected matching the last datarate and bandwidth, a single packet and packet error are counted for the current epoch.

When transec detects an invalid pdu length (greater than max allowed, currently 2000 bytes) it logs a single packet error.

SNR and RSSI—ADR maintains a history of the last 8 RSSI and SNR measurements.

Each time a block of soft decisions is ready to go to the Viterbi Coprocessor (VCP), the burst SNR and RSSI is passed to the ADR. This may happen more than once for a single rx pdu if it is a big block.

The RSSI estimate is obtained from the AGC lookup table address, which is read once when the waveform dsp is interrupted for the modem rx active event.

The SNR estimate accumulates over the entire burst, so the last value passed to ADR will have been averaged over the largest number of samples.

Each time the SNR and RSSI are passed to ADR, the SNR and RSSI for the current rx pdu is overwritten.

Rx EOM—Due to the way the ADR information is not available at a convenient single point in time for a given rx pdu, the packet/packet error, rssi, and snr information is asynchronously passed to ADR as it becomes available.

When the last frame of decoded data (or only frame) is ready to be sent to modem dsp, the PhyAdrEom is called. This call informs ADR that the current rx pdu is done. This increments the data history buffer index.

Each time ADR is told EOM:

```
IF the rx pdu is the recommended waveform ID:
    a counter "pktsSinceChange" is incremented for
    the rx node id;
    a moving average packet count and packet error
count is updated for node id;
    Last_epoch_rx = Current Epoch Count;
    If AdrState == WAITING_FOR_CHANGE then AdrState
= CHANGE_HOLDOFF.
```

It is necessary to check that the received waveform is the recommend waveform for two reasons:

1) It is desirable to average metrics and packet errors received at the recommended rate to avoid biasing the estimates with information from lower data rates and IF bandwidths; and 2) After making a change to the recommended waveform, the system must wait for the recommended waveform to be received before making additional changes because the system needs to flush the statistics from the previous waveform as they are invalid once the data rate changes.

Last_epoch_rx is used to determine how many epochs have passed since the last data pdu was received. Data metrics are preferred for adapting over beacon metrics, but if data has not been received in a long time, the system must use beacon metrics. Receipt of OLSR packets would cause the system to have recent data, but not for the correct rate. OLSR packets provide no way for ADR to determine that they are special, i.e. they look like data from a particular node id at the beacon WF ID. The current method to know that data has not been received in a long time is to log epoch count if the pdu was sent with the recommended Waveform ID.

RSSI and SNR metrics are passed to ADR whether or not any packets within the PDU pass CRC or are even found by the transec decoder (corrupt transec SOM pattern).

Beacon—Beacon RSSI and SNR are passed to ADR each time a Beacon passes CRC.

For each node ID a history buffer of 8 samples is maintained for both Beacon RSSI and Beacon SNR.

Moving averages of SNR, $SNR^2$ are updated for use in determining beacon based data rate.

OLSR—When OLSR is received, the metrics only stored if it is received using the same waveform id as the last recommended rate. Otherwise the information is discarded.

DV—Digital Voice is treated the same as data, if the last recommended rate matches the DV waveform, the SNR and RSSI may be used.

Data Rate Recommendation

When Recommendations are Made

Each time a beacon passes CRC a recommendation is made.

Each time a Viterbi or turbo-coded decode block/Interleaver Frame is done decoding and ready to be sent to the modem dsp a recommendation is provided. For big blocks, this will happen more than once per rx pdu. There is no interface to the modem dsp for 'No Recommendation": Every pdu sent to the modem dsp crunches through the ADR decision rules and outputs a recommendation.

Selecting Beacon Based or Data Based

Each time a data rate is recommended, if Last_epoch_rx for the source node id is within the last 23 epochs (~3 seconds), a data based recommendation is used, else beacon based recommendation.

| Data Based Rules | | |
|---|---|---|
| Conditions | Action | Comment |
| State Machine Behavior | | |
| If AdrState == CHANGE_HOLDOFF AND pktsSinceChange < CHANGE_HOLDOFF_PACKETS | NONE | Prevents making another change until the history buffers are filled with data for the new recommended waveform |
| If AdrState == WAITING_FOR_CHANGE | NONE | Prevents making another change until the recommended waveform has been received |
| If AdrState == CHANGE_HOLDOFF AND pktsSinceChange == CHANGE_HOLDOFF_PACKETS | AdrState = ACTIVE firstSNR = CurrentAverageSnr firstRssi = CurrentAverageRssi Evaluation of the change rules below begins at this point | Enough packets have accumulated to make a new recommendation. Save current averages to check for an increase in avg SNR |
| RULE FOR DECREASING DATA RATE | | |
| If EstimatedPer > TARGET_PER RULES FOR INCREASING DATA RATE: NOTE: These are only evaluated if EstimatedPER = 0 | Decrease WF by 1 | |
| Current WF >= 1.2 MHz 2PSK AND AvgRssi >= STRONG_RSSI | Change waveform to MAX RATE | No packet errors, very good RSSI and SNR. Low SNR variance. |

Data Based Rules -continued

| | | |
|---|---|---|
| AND<br>AvgSnr >= MAX_RATE_SNR<br>AND<br>SnrVar <=<br>MAX RATE_SNR_VAR_THRESH<br>AND<br>DeltaSnr >= 0 | | Aggressive jump to maximum data rate. |
| AvgRssi >= STRONG_RSSI<br>AND<br>AvgSnr >= STRONG_SNR | Increase WF by 1 | Good SNR and RSSI. |
| AvgRssi >= firstRssi +<br>INCREASE_RATE_CHG_THRESH_RSSI | Increase WF by 1 | Avg RSSI has increased by 6 dB from the Avg RSSI when the last change was made |
| pktsSinceChange >=<br>NUM_SNR_SAMPS<br>AND<br>SnrVar < DELTA_SNR_VAR_THRESH<br>AND<br>AvgSnr > firstSnr<br>+<br>INCREASE_RATE_CHG_THRESH_SNR | Increase WF by 1 | Have accumulated longer averager length (at least 16 epochs) and SNR variance is low and Avg SNR has increased by 3 dB from last rate change. |
| pktsSinceChange >=<br>NUM_SNR_SAMPS<br>AND<br>SnrVar >=<br>DELTA_SNR_VAR_THRESH<br>AND<br>AvgSnr > firstSnr<br>+<br>INCREASE_RATE_CHG_THRESH_SNR<br>+<br>INCREASE_RATE_CHG_SNR_DERATE | Increase WF by 1 | Have accumulated longer averager length (at least 16 epochs) and SNR variance is high and Avg SNR has increased by 7 dB from last rate change. |
| Current WF < 1.2 MHz 2PSK<br>AvgRssi >=<br>ATTEMPT_WF4_MIN_RSSI<br>AND<br>AvgSnr >= ATTEMPT_WF4_MIN_SNR | Change waveform to 1.2 MHz 2PSK | This is used to move up past the low rate GMSK wf's where SNR estimates are pessimistic especially in fading/multipath channels, to a PSK wf where SNR can be more accurately estimated. |
| Lookup table based rate increase: If none of the above conditions triggered, finally the table below is used to determine whether the data rate can be increased. | | |

| | Data Rate Increased by 1 if the below average SNR threshold is met, conditioned on the SNR variance estimate. | |
|---|---|---|
| Current Waveform | If SnrVar <= 1 | If SnrVar > 1 |
| 2.5 MHz 4 PSK | 12 | 16 |
| 1.2 MHz 4 PSK | 12 | 16 |
| 1.2 MHz R¾ 2PSK | 8 | 12 |
| 1.2 MHZ R½ 2PSK | 6 | 10 |
| 1.2 MHz 16 Chip | 4 | 8 |
| 1.2 MHz 32 Chip | −1 | 3 |

Beacon Based Rules

The beacon rate is based only upon average SNR and SNR variance for beacons.

| SNR | SNR Variance | Rate |
|---|---|---|
| >=15 | <=8 | WFM_5p0_04_PSK |
| >=12 | <=8 | WFM_2p5_04_PSK |
| >=9 | <=8 | WFM_1p2_04_PSK |
| >=6 | <=8 | WFM_1p2_02_PSK |
| >=3 | <=8 | WFM_1p2_W_08 |
| >=0 | <=8 | WFM_1p2_W_16 |
| <0 | <=8 | WFM_1p2_W_32 |
| >=19 | >8 | WFM_5p0_04_PSK |
| >=16 | >8 | WFM_2p5_04_PSK |
| >=13 | >8 | WFM_1p2_04_PSK |
| >=10 | >8 | WFM_1p2_02_PSK |
| >=7 | >8 | WFM_1p2_W_08 |
| >=4 | >8 | WFM_1p2_W_16 |
| <4 | >8 | WFM_1p2_W_32 |

Beacon Average SNR and SNR Variance is a moving average of the SNR from the last 8 beacons that passed CRC. No accounting for missed acquisitions or network reorganization is made.

After changing the data rate based on beacon information, rate change is held off for 23 epochs (~3 seconds) to prevent thrashing of the rate due to the high variance of the beacon SNR estimate.

fading conditions. After making a rate change, ADR is held off from making further changes until 8 samples have been accumulated. Once 8 samples have accumulated, an 8 sample average and variance estimate is used for checking some rate increase rules. After a full 16 samples have accumulated, the longer average is used instead. Increasing data rate based on an observed increase in average SNR from the initial average

| ADR Algorithm Constants and Thresholds | | | |
|---|---|---|---|
| TARGET_PER | 10 | % | Target Packet Error Rate |
| DATA_METRIC_AGE_OUT_EPOCH_COUNT | 23 | Epochs | Number epochs before data metrics are aged out |
| CHANGE_HOLDOFF_PACKETS | 8 | Epochs | Minimum number of epochs after a rate change before another change will be made |
| NUM_BEAC_SAMPS | 8 | Epochs | Number of Beacons used for estimating SNR, RSSI, and variance |
| POST_CHANGE_HOLDOFF_BEACONS | 32 | Epochs | Minimum number of epochs after a beacon based rate change before another change will be made |
| STRONG_RSSI | −70 | dBm | Minimum RSSI at which with high confidence max data rate will be supported |
| STRONG_SNR | 15 | dB | Minimum SNR at which with medium confidence maximum rate will be supported |
| INCREASE_RATE_CHG_THRESH_SNR | 3 | dB | Threshold for increasing rate based on a change in averge SNR when SNR variance is low |
| INCREASE_RATE_CHG_THRESH_RSSI | 6 | dB | Threshold for increasing rate based on change in average RSSI |
| LARGE_SNR_VARIANCE_THRESHOLD | 8 | $dB\hat{\ }2$ | SNR variance threshold for switching between beacon SNR LUTs |
| FADING_SNR_MARGIN | 4 | dB | Beacon SNR LUT shift when SNR variance is high |
| MAX_RATE_SNR | 16 | dB | Required avg SNR for aggressive jump to max rate |
| MAX_RATE_SNR_VAR_THRESH | 2 | $dB\hat{\ }2$ | Required max SNR variance for aggressive jump to max rate |
| ATTEMPT_WF4_MIN_RSSI | −80 | dBm | Required min avg RSSI for jump to WF4 (1.2 MHz 2PSK) |
| ATTEMPT_WF4_MIN_SNR | 4 | dB | Required min avg SNR for jump to WF4 (1.2 MHz 2PSK) |
| DATA_SNR_VAR_THRESH | 1 | $dB\hat{\ }2$ | Data SNR variance threshold for switching between data SNR LUTs |
| DATA_LARGE_VAR_DERATE | 4 | dB | Data SNR LUT shift when SNR variance is high |
| DELTA_SNR_VAR_THRESH | 2 | $dB\hat{\ }2$ | Data SNR variance threshold for increasing data rate based increase in average SNR |
| INCREASE_RATE_CHG_SNR_DERATE | 3 | dB | Threshold for increasing rate based on a change in averge SNR when SNR variance is high |
| NUM_SNR_SAMPS | 16 | Epochs | Minimum number of epochs after a rate change before a recommendation based on increase in average SNR. Also 'long' SNR averager length |

SNR Averager

The SNR average and variance estimate changes its average length to allow for fast attack when good metrics are present but also to give a better SNR estimate in rapidly SNR at a given data rate is prevented from running until the full 16 samples have been accumulated.

For purposes of description, some background information on coding, interleaving, and an exemplary wireless, mobile radio communications system that includes ad-hoc capability and can be modified for use is set forth. This example of a communications system that can be used and modified for use with the present invention is now set forth with regard to FIGS. 6 and 7.

An example of a radio that could be used with such system and method is the software defined Falcon™ III Manpack radio manufactured and sold by Harris Corporation of Melbourne, Florida. This type of radio can support multiple bandwidths from 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification, which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 6:
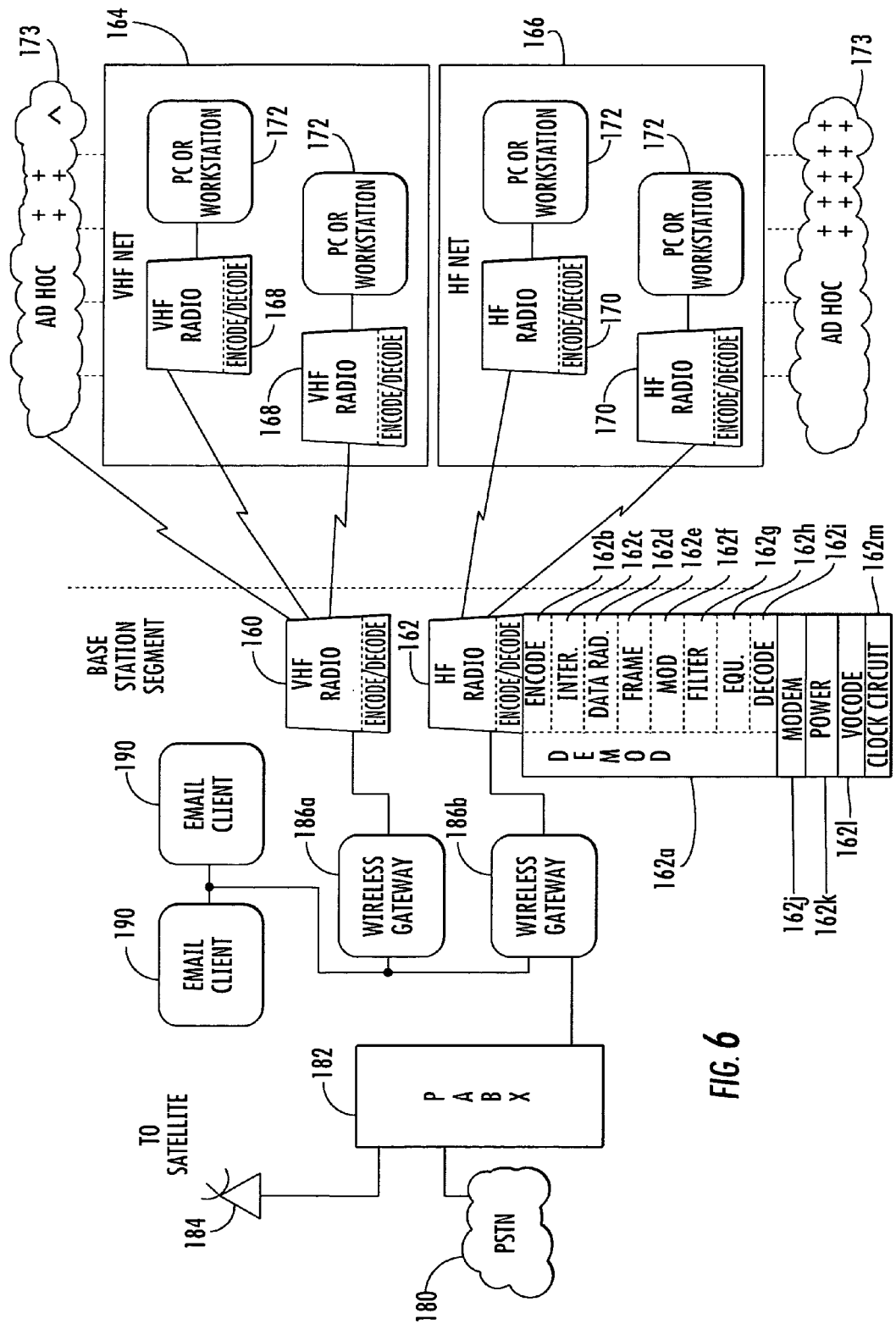
FIG. 6 is a block diagram of an example of a communications system and showing different network components that can be used in accordance with a non-limiting example of the present invention.

For purposes of description only, a brief description of an example of a communications system that includes communications devices is described relative to a non-limiting example shown in FIG. 6. This high-level block diagram of a communications system includes a base station segment and wireless message terminals that could be modified for use with the present invention. The base station segment includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168,170. Ad-hoc communication networks 173 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 162*a* and appropriate convolutional encoder circuit 162*b*, block interleaver 162*c*, data randomizer circuit 162*d*, data and framing circuit 162*e*, modulation circuit 162*f*, matched filter circuit 162*g*, block or symbol equalizer circuit 162*h* with an appropriate clamping device, deinterleaver and decoder circuit 162*i* modem 162*j*, and power adaptation circuit 162*k* as non-limiting examples A vocoder circuit 162*l* can incorporate the decode and encode functions and a conversion unit could be a combination of the various circuits as described or a separate circuit. A clock circuit 162*m* can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 180, which connects to a PABX 182. A satellite interface 184, such as a satellite ground station, connects to the PABX 182, which connects to processors forming wireless gateways 186*a*, 186*b*. These interconnect to the VHF radio 160 or HF radio 162, respectively. The processors are connected through a local area network to the PABX 182 and e-mail clients 190. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 7:
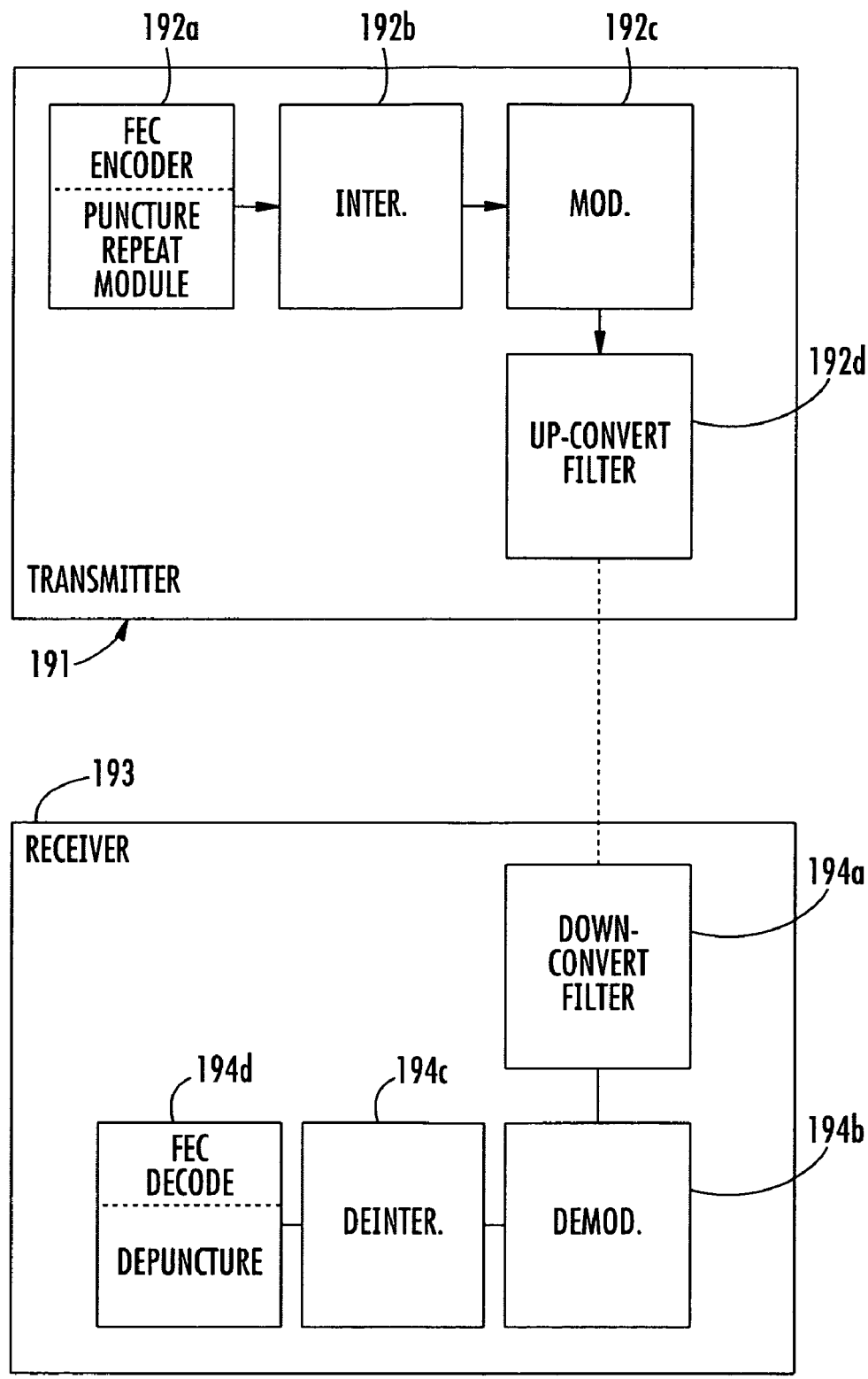
FIG. 7 is a high-level block diagram showing basic components that can be used in a mobile radio in accordance with a non-limiting example of the present invention.

A communications system that incorporates communications devices can be used in accordance with non-limiting examples of the present invention and is shown in FIG. 7. A transmitter is shown at 191 and includes basic functional circuit components or modules, including a forward error correction encoder 192a that includes a puncturing module, which could be integral to the encoder or a separate module. The decoder 192a and its puncturing module includes a function for repeating as will be explained below. Encoded data is interleaved at an interleaver 192b, for example, a block interleaver, and in many cases modulated at modulator 192c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 192d, which could be formed as an integrated module or separate modules. Communications signals are transmitted, for example, wirelessly to receiver 193.

At the receiver 193, down conversion and filtering occurs at a down converter and filter 194a, which could be integrated or separate modules. The signal is demodulated at demodulator 194b and deinterleaved at deinterleaver 194c. The deinterleaved data (i.e. bit soft decisions) is decoded and depunctured (for punctured codes), combined (for repeated codes) and passed through (for standard codes) at decoder 194d, which could include a separate or integrated depuncturing module. The system, apparatus and method can use different modules and different functions. These components as described could typically be contained within one transceiver.

It should be understood, in one non-limiting aspect of the present invention, a rate ½, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from ⅛ to ⅞ in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate ½ code is used, the transmission of a subset of the output bits of the encoder can convert the rate ½ code into a rate ⅔ code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a lookup table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of ½, ⅔, ¾, ⅘, ⅚, 6/7, ⅞ using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate ½ code.

The Viterbi decoder parameters could include the convolutional code rate as a ratio of input to output bits for the convolutional encoder. The puncture rate could be the ratio of input to output bits for the convolutional encoder using a puncturing process and can be derived from a rate ½ mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

The system and extended preamble, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device. The portable wireless communications device as a radio can include a transceiver as an internal component and handheld housing with an antenna and control knobs. A Liquid Crystal Display (LCD) or similar display can be positioned on the housing in an appropriate location for display. The various internal components, including dual processor systems for red and black subsystems and software that is conforming with SCA, is operative with the radio. Although a portable or handheld radio is disclosed, the architecture as described can be used with any processor system operative with the transceiver in accordance with non-limiting examples of the present invention. An example of a communications device that could incorporate the system and method, in accordance with non-limiting examples of the present invention, is the Falcon® III manpack or tactical radio platform manufactured by Harris Corporation of Melbourne, Fla.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
a plurality of mobile nodes comprising an N number of nodes and forming a mobile ad-hoc network;
a plurality of wireless communications links connecting the mobile nodes together;
each mobile node comprising a communications device for transmitting and routing data packets wirelessly to other mobile nodes via the wireless communications links in accordance with a time division multiple access (TDMA) data transmission protocol using a TDMA epoch that is divided into a beacon interval, digital voice interval and digital data interval, wherein mobile nodes are operative for monitoring channel conditions using the beacon, digital voice and digital data intervals and providing from each mobile node a network connectivity performance as valid receptions occur within mobile nodes, wherein a mobile node is operative for setting a data rate for the other mobile nodes comprising an N−1 number of nodes using monitored channel conditions for the beacon, digital voice and digital data intervals, wherein a mobile node is operative for determining the signal-to-noise ratio (SNR), received signal strength indication (RSSI) and packet error rate (PER) for N−1 mobile nodes based on valid beacon, digital voice and digital data interval receptions, and further comprising a database containing TDMA waveform selections, wherein a mobile node is operative for selecting a TDMA waveform from the database based on the SNR, RSSI and a SNR variance.

2. A communications system, comprising:
a plurality of mobile nodes comprising an N number of nodes and forming a mobile ad-hoc network;
a plurality of wireless communications links connecting the mobile nodes together;
each mobile node comprising a communications device for transmitting and routing data packets wirelessly to other mobile nodes via the wireless communications links in accordance with a time division multiple access (TDMA) data transmission protocol using a TDMA epoch that is divided into a beacon interval, digital voice interval and digital data interval, wherein mobile nodes are operative for monitoring channel conditions using the beacon, digital voice and digital data intervals and providing from each mobile node a network connectivity performance as valid receptions occur within mobile nodes, wherein a mobile node is operative for setting a data rate for the other mobile nodes comprising an N−1 number of nodes using monitored channel conditions for the beacon, digital voice and digital data intervals, wherein a mobile node is operative for determining a signal-to-noise ratio (SNR), received signal strength indication (RSSI) and packet error rate (PER) for N−1 mobile nodes based on valid beacon, digital voice and digital data interval receptions, and maintaining a history of the SNR, RSSI and PER over an interval corresponding to X seconds for each respective N−1 node enhancing the history of the SNR, RSSI and PER using receptions of digital data intervals.

3. A mobile ad-hoc network (MANET), comprising:
a plurality of mobile nodes comprising an N number of nodes and operating together and communicating with each other via wireless communications links in a time division multiple access (TDMA) data transmission protocol using a TDMA epoch that is divided into a beacon interval, digital voice interval and digital data interval;

each mobile node comprising a wireless communications device configured to monitor channel conditions using the beacon, digital voice and digital data intervals and provide a network connectivity performance as valid receptions occur within mobile nodes and set a data rate at a mobile node using monitored channel conditions for the beacon, digital voice and digital data intervals, wherein a mobile node is operative for determining a signal-to-noise ratio (SNR), received signal strength indication (RSSI) and packet error rate (PER) for N−1 mobile nodes based on valid beacon, digital voice and digital data receptions, and further comprising a database containing TDMA waveform selections, wherein a mobile node is operative for selecting a TDMA waveform from the database based on the SNR, RSSI and a SNR variance.

4. A method for communicating, comprising:

forming a mobile ad-hoc network from a plurality of mobile nodes comprising an N number of nodes using a plurality of wireless communications links connecting the mobile nodes together;

transmitting and routing data packets wirelessly to other mobile nodes via the wireless communications links in a time division multiple access (TDMA) data transmission protocol using a TDMA epoch that is divided into a beacon interval, digital voice interval and digital data interval;

monitoring channel conditions at each mobile node using the beacon, digital voice and digital data intervals;

providing from each mobile node a network connectivity performance as valid beacon, digital voice and digital data receptions occur within mobile nodes;

setting a data rate at a mobile node for the other N−1 mobile nodes using monitored channel conditions from the beacon, digital voice and digital data intervals;

determining a signal-to-noise ratio (SNR), received signal strength indication (RSSI) and packet error rate (PER) for N−1 mobile nodes based on valid beacon, digital voice and digital data interval receptions;

maintaining a history of the SNR, RSSI and PER over an interval corresponding to X seconds for each respective N−1 node; and improving the history of the SNR, RSSI and PER using receptions of digital data intervals.

* * * * *